(12) United States Patent
Jin

(10) Patent No.: US 6,348,022 B1
(45) Date of Patent: Feb. 19, 2002

(54) PLANETARY GEAR TRANSMISSION APPARATUS

(76) Inventor: Wei A Jin, No. 17, SanChung Rd., SanChung Li, Chutung Town, Hsinchu (TW)

( * ) Notice: Subject to any disclaimer, the term of this patent is extended or adjusted under 35 U.S.C. 154(b) by 0 days.

(21) Appl. No.: 09/559,588

(22) Filed: Apr. 28, 2000

(30) Foreign Application Priority Data

Feb. 18, 2000 (TW) ........................... 89202594 U

(51) Int. Cl.$^7$ ............................................. F16H 57/08
(52) U.S. Cl. ............................................................ 475/342
(58) Field of Search .................................... 475/342, 341

(56) References Cited

U.S. PATENT DOCUMENTS

| 3,675,510 A | * | 7/1972 | Duggar | 475/342 |
| 4,429,594 A | * | 2/1984 | Heller | 475/342 |
| 4,850,247 A | * | 7/1989 | Yu | 475/342 |
| 4,942,781 A | * | 7/1990 | Hiri | 475/342 |

FOREIGN PATENT DOCUMENTS

| DE | 226941 | * | 9/1985 | 475/342 |
| JP | 6388346 | * | 4/1988 | 475/342 |
| JP | 4131542 | * | 5/1992 | 475/342 |

* cited by examiner

Primary Examiner—Charles A Marmor
Assistant Examiner—Ha Ho
(74) Attorney, Agent, or Firm—Troxell Law Office PLLC

(57) ABSTRACT

A planetary gear transmission apparatus includes a sun gear, a first inner gear ring, a second inner gear ring and a planetary gear set constitutes a plurality of planetary gears. The first inner gear ring has increased tooth space, increased tooth root and decreased tooth thickness. The second inner gear ring has decreased tooth space, decreased tooth root and increased tooth thickness. The first and second inner gear rings have substantially same size of tooth root circles. The planetary gear is cylindrical formed with an uniform diameter. The rotational contact surfaces between the components are curved plane contact. The apparatus may be made small size at a low cost and with no stress concentration. Friction loss is less. Transmission efficiency may be increased without overheating at high rotation speed.

7 Claims, 4 Drawing Sheets

PLANETARY GEAR TRANSMISSION APPARATUS

1. FIELD OF THE INVENTION

This invention relates to a planetary gear transmission apparatus and particularly to a planetary reduction gear that is able to reduce high speed motor rotation and to increase torque.

2. BACKGROUND OF THE INVENTION

Motor rotation transmission usually uses a gear set for reducing or increasing rotation speed. The planetary gear transmission has high variable speed ration and is widely used in many different type of mechanical transmission application.

FIGS. 1 and 2 illustrate a conventional gear transmission device 10 which includes a sun gear 11, a first inner gear ring 12, a second inner gear ring 13 and a planetary gear set 14 consisting of a plurality of planetary gears 141.

The first and second inner gear ring 12 and 13 have respectively a plurality of teeth 121 and 131 formed therein. The first inner gear ring 12 has a circular space with an inside diameter slightly larger than the outside diameter of the second inner gear ring 13 for housing the second inner gear ring 13 therein and forming a hollow compartment within the first and second inner gear ring. The planetary gear set 14 has a pair of planetary gears 141 each being held between a pair of gear racks 142 by a pin 143, and engages respectively with the first and second inner gear ring 12 and 13. The assembled planetary gear set 14 is held in the hollow compartment. When in use, a sun gear 11 engages with the planetary gears 141 at a left half portion thereof which in turn engages with the first inner gear ring 12 (shown in FIG. 2) for driving the planetary gears 141. As the first inner gear 12 is usually serving as a power input ring, the rotating planetary gears 141 then drive the second inner gear ring 13 rotating for output power at reduced speed. The teeth number of the first inner gear ring 12 usually is less than the second inner gear ring 13. Hence the crown and root circles of the first inner gear ring 12 are smaller than those of the second inner gear ring 13. For the planetary gears 141 to engage both with the first and second inner gear rings 12 and 13, the teeth profile of the planetary gears 141 should be made in a step manner to match different size of crown and root circles. For instance, the left half portion of the planetary gears 141 has a lower teeth profile for engaging with the first inner gear ring 12 while the right half portion has a higher teeth profile for engaging with the second inner gear ring 13. The design and fabrication of the planetary gears 141 thus become more complicated and expensive. The high profile teeth has narrower teeth crown which tends to produce noise and is prone to rupture.

Furthermore, the sun gear 11 engages with only a half section of the axial length of the planetary gears 141. The axial positioning and alignment between the gears is difficult to attain at precise level and may result in vibration and noise production. The high speed rotation also tends to create vibration result from torque and may result in high friction and temperature, lower transmission efficiency, accelerated wearing and lower durability.

Moreover heat treatment during fabrication of the planetary gears 141 will have high stress concentration happened at the corner section like the juncture of step teeth which may result in teeth rupture under high speed or high work load condition.

In order to remedy the problems set forth above, the components of the gear transmission device 10 have to be made of higher strength steel at a greater size. Hence it is mostly used in large size transmission means such as pre-mixture concrete truck, heavy truck and the like. It rarely being used in smaller size apparatus such as electric power hand-tools in which gear transmission means are mostly made by lower cost powder metallurgy technique.

There is another problem for the conventional transmission device 10. The friction contact (other than teeth bearing surface) between the rotating elements is usually plane contact which has high friction coefficient. A slight deviation between the contact surface may result in vibration. Friction induced temperature is high and easily reaches above 100° C., and may result in poorer lubrication effect. Hence transmission efficiency of the conventional gear transmission device is usually lower than 0.9. There is still a room for improvement.

SUMMARY OF THE INVENTION

It is an object of this invention to provide a planetary gear transmission apparatus, which is lower cost to fabricate and assemble, has lower noise during operation, has longer durability and may be used in small size devices.

It is another object of this invention to provide a planetary gear transmission apparatus that has lower friction and operation temperature and enhanced transmission efficiency.

In one aspect, the transmission apparatus of this invention includes a sun gear, a first inner gear ring, a second inner gear ring and a planetary gear set consisting of a plurality of planetary gears. The first inner gear ring has an increased tooth root circle, larger tooth space and smaller teeth thickness. The second inner gear ring has a reduced tooth root circle, smaller tooth space and larger tooth thickness. The first and second inner gear rings have substantially same size of tooth root circle. The planetary gear has uniform teeth profile on a barrel type member. Hence stress concentration may be avoided. The apparatus may be made smaller size at lower cost. The friction contact surface between the rotation elements are formed in a curved plane so that friction loss and heat may be reduced.

In another aspect, the teeth of the inner gear ring is fabricated by gear rack cutting. For the first inner gear ring, the tooth crown height is increased by about 20–35% than regular value (e.g., the value for making the conventional tooth as which illustrated in FIGS. 1 and 2). The tooth root height is reduced by about 10–25% and the tooth thickness is increased by about 2–10% than regular value. For the second inner gear ring, the tooth crown height is reduced by about 1–5% tooth root height is increased by about 1–5% and tooth thickness is reduced by about 1–8% than regular value.

Each planetary gear is held between a pair of gear racks by a pin with about 0.1–0.15 mm of tolerance between the gear and the rack for the gear to rotate smoothly between the racks. The contact surface between the gear ring and the rack has a curvature of about 20–50 times of the gear diameter.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 1:
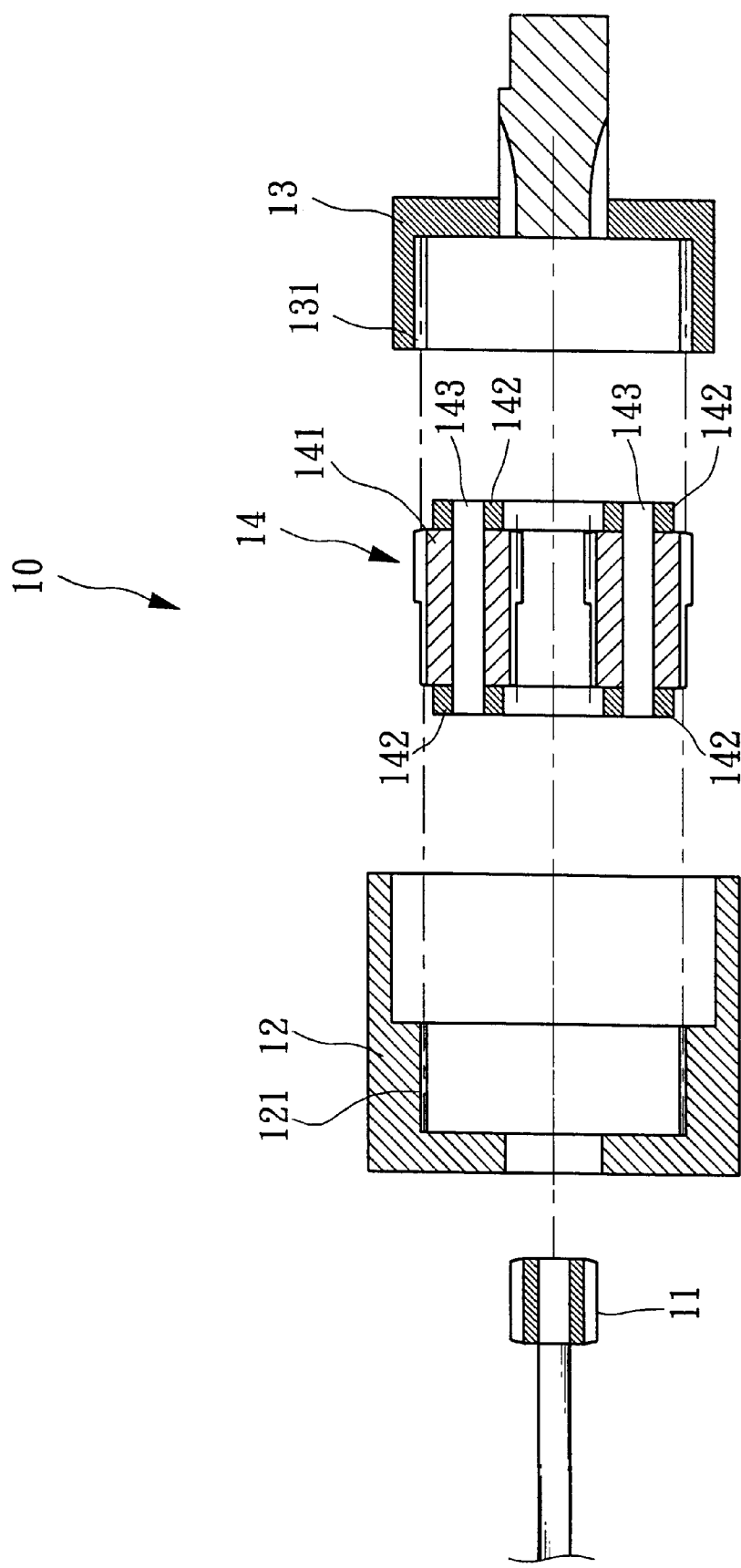
FIG. 1 is an exploded sectional view of a conventional planetary gear transmission device.
Figure 2:
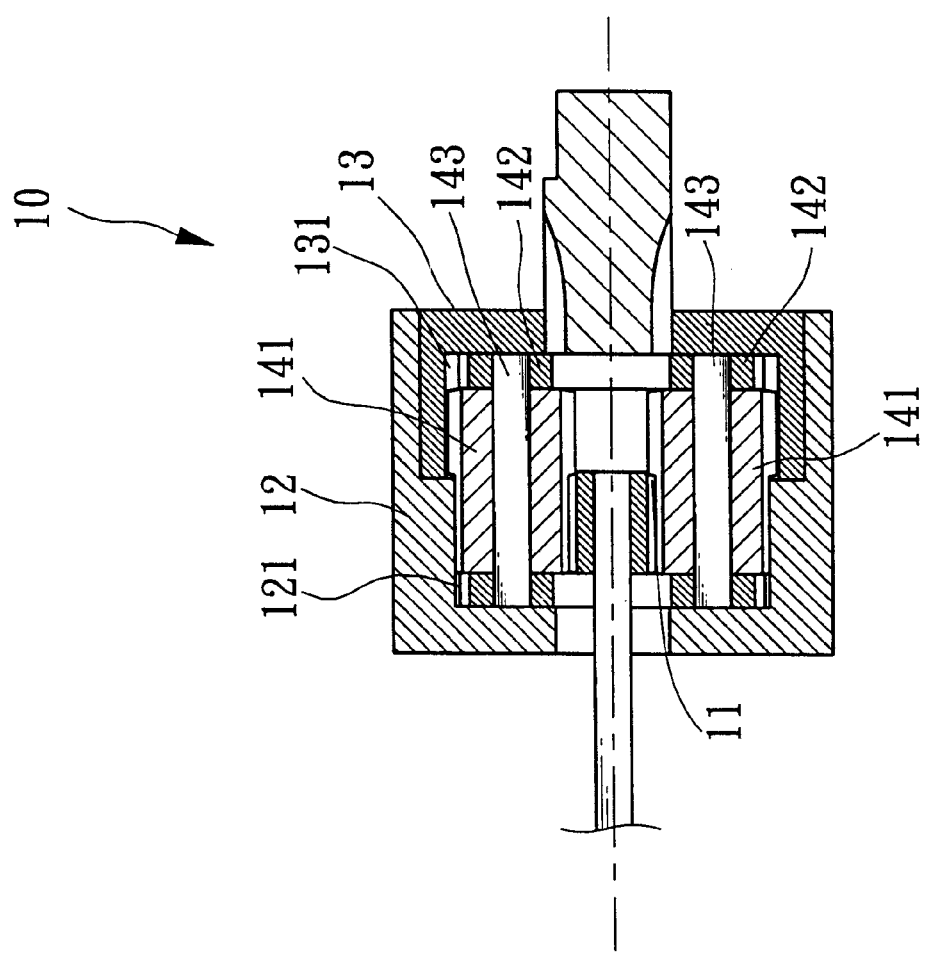
FIG. 2 is an assembled sectional view of the planetary gear transmission device shown in FIG. 1.
Figure 3:
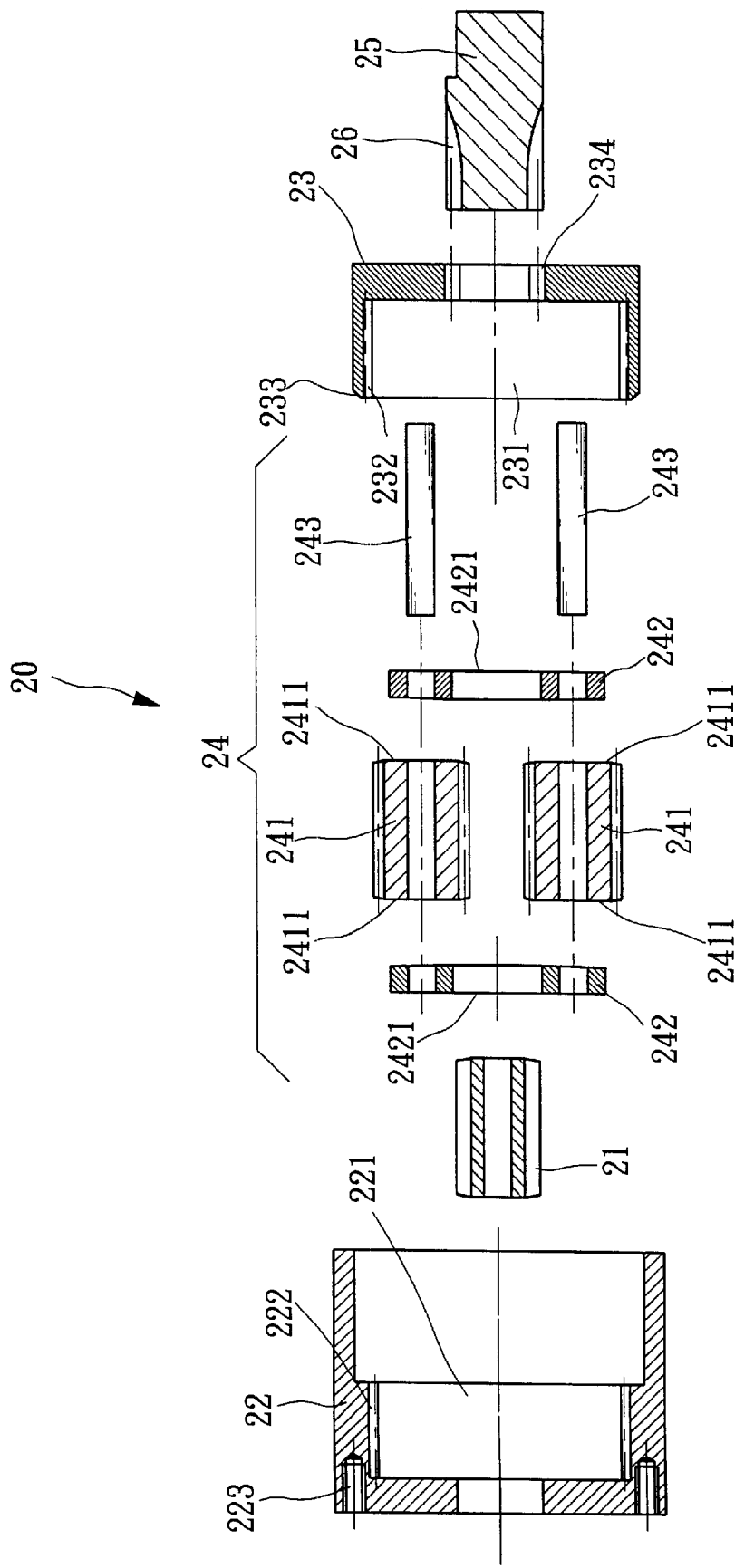
FIG. 3 is an exploded sectional view of this invention.
Figure 4:
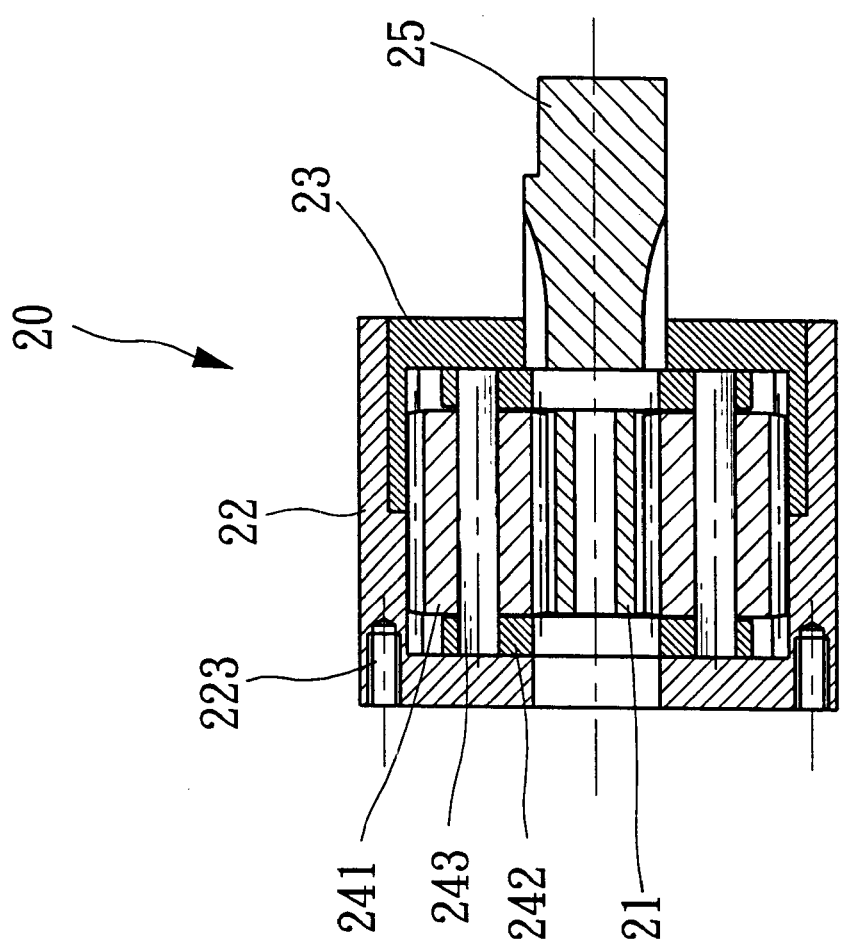
FIG. 4 is an assembled sectional view of this invention.

Referring to FIGS. 3 and 4, the planetary gear transmission apparatus 20 according to this invention includes a sun gear 21, a first inner gear ring 22, a second inner gear ring 23, a planetary gear set 24 consisting of a plurality of planetary gears 241, an output shaft 25 and a spindle shaft 26. The spindle shaft 26 engages with a spindle mount 234 formed on the second inner ring 23. The planetary gear set 24 further has a pair of gear racks 242 for supporting a plurality of pins 243 therebetween. Each pin 243 holds a planetary gear 241 which has a gap of about 0.1–0.15 mm formed between one end thereof and a side wall of the gear rack 242 so that the planetary gear 241 may rotate smoothly.

The first and second inner gear ring 22 and 23 have respectively an inside hollow space 221 and 231, and a first inner gear 222 and a second inner gear 232 formed on the inside walls thereof. The first inner gear ring 22 further has a cavity which has a diameter slightly larger than outside diameter of the second inner gear ring 23 for housing the same therein. The number of the teeth of the first inner gear 222 is less than that of the second inner gear 232 by an integer number times the number of the planetary gear 241. The first inner gear ring 22 also has a plurality of screw bores 223 formed in a side wall for engaging with other elements such as motor seat to form a stationary member.

The sun gear 21 and planetary gear set 24 are held in the hollow space formed by the engaged first and second inner gear ring 22 and 23. A portion (about a half on the left hand side shown in FIG. 4) of the planetary gear 241 engages with the first inner gear 222 and another portion (about a half on the right hand side shown in FIG. 4) thereof engages with the second inner gear 232.

In the design of a reducing transmission means, the sun gear 21 is generally driven by a motor (not shown in the figures) rotating at high speed. The sun gear drives the planetary gears 241 rotating in the first inner gear ring 22 and in turn drives the second inner gear ring 23 to rotate to produce output power through the output shaft 25 and spindle shaft 26 which is positively engaged with the second inner gear ring 23.

The rotation speed reducing ratio may be calculated by the following equation:

(S+R1)/(S/(1−(R1/R2)))=speed reducing ratio

Where S is teeth number of the sun gear

R1 is teeth number of the first inner gear 222 (power input gear)

R2 is teeth number of the second inner gear 232 (power output gear)

Furthermore, because the teeth number difference between the first and second inner gear 222 and 223 must be an integer number times the planetary gear number, the following equations also apply:

(S+R1)/PN=integer number;

(S+R2)/PN=integer number

Where PN is the number of the planetary gear 241. The most important improvements of the present invention are illustrated as following:

The first and second inner gears 222 and 232 are formed in the following manner (one of the methods to form gear teeth is the "gear rack cutting" method, however it is also possible to make the gear by other means in the art):

In the structure of the gears 222 and 232, tooth space is increased for the first inner gear 222 but decreased for the second inner gear 232. Tooth root circles are substantially same for the first and second inner gears 222 and 223. Hence the planetary gear 241 may have uniform diameter like a barrel without the stepped gear top that happens to the conventional planetary gear. The planetary gear 241 and sun gear 21 may have equal length to make full length engagement rather than partial engagement (like the conventional one does). The positioning and alignment of the sun gear 21 may become easier and more accurate. The rotation and power transmission are smooth and steady with less friction loss and noise. Transmission efficiency may be increased. Operation heat generation may be reduced to lower lubrication oil temperature. Stress concentration may also be avoided. Mechanical strength of the gear 241 thus may be improved. The size of gear set thus may be reduced. A lower cost production method such as powder metallurgy may be used for mass production. As the planetary gear 241 has a uniform diameter, alignment and assembly become simpler and quicker, and become less cost. Furthermore the planetary gear 241 may be formed in a regular tooth shape without increasing tooth crown height, operation noise generation is less and durability may be increased. It thus may be made smaller size at lower cost to use in a wide variety of applications and devices such as electric handtools, exercise facilities and the like.

Fabrication of the first and second inner gear ring 22 and 23 may be done by means of gear rack cutting. For making the first inner gear 222, the gear rack cutter has increased value about 20–35% for tooth crown height, decreased tooth root circle about 10–25% and increased tooth thickness about 2–10% regular inner gear. For making the second inner gear 232, the gear rack cutter has decreased tooth crown height about 1–5%, increased tooth root circle about 1–5% and decreased tooth thickness about 1–8% over regular inner gear.

As a result of aforesaid changes, some of the tooth cutter parameters might also be changed, such as pitch, normal pressure angle, fillet radius of tooth crown and the like. As they form very few part of this invention and thus will be omitted herein.

Through the aforesaid gear forming process, the tooth space of the first inner gear 222 may be increased (i.e., with decreased tooth thickness). And the second inner gear 232 may have decreased tooth space and increased tooth thickness. However both the first and second inner gear ring 22 and 23 have substantially same value of tooth root circle diameter.

Sample of the gears 21, 241 and gear rings 22 and 23 made by aforesaid technique by applicant have excellent assembly with tooth contact ratio above 1. The operation also proved smoothly.

In this invention, the side wall 2421 of the gear rack 242 that making contact against the first and second inner gear ring 22 and 23 are formed in a curved plane with a diameter about 20–50 times of the gear rack 242 diameter. By the same taken, the side wall 2411 of the planetary gear 241 facing the gear rack 242 also is formed in a curved plane with a diameter about 20–50 times of the planetary gear 241 diameter. By means of such structure, the rotation friction between the gear rack 242 and the inner gear ring, and between the planetary gear 241 and the gear rack 242 is much smaller than conventional plane to rotation friction because of smaller contact surface. The curved plane contact also may reduce rotational vibration and noise, and reduce heat generation. Transmission efficiency may be increased above 0.95. Durability may also be enhanced. Sample tests show that after running this invention for an hour with the sun gear 21 at 10000 rpm, outside rim temperature of the first inner ring 22 is maintained at about 60–70° C. Conventional planetary gear transmission device running under same condition has temperature risen above 100° C. and may cause lubricant liquifiction and result in poorer lubrication effect.

This invention not only may be used in large and heavy duty machineries such as cement mixing truck, concrete truck, machine tools (lathe, punching machine, milling machine, drilling machine), wheel chair, and electric vehicle, it also may be used in small size facilities and devices such as electric handtools, sheaving machine, saw, hammer, waxing machine, electric jack, sprinkler, exercise equipments and the like.

It may thus be seen that the objects of the present invention set forth herein, as well as those made apparent from the foregoing description, are efficiently attained. While the preferred embodiment of the invention has been set forth for purpose of disclosure, modifications of the disclosed embodiment of the invention as well as other embodiments thereof may occur to those skilled in the art. For instance of reducing speed, this invention may also be used for increased speed transmission. The curved plane may be formed on a side wall of the gear rack rather then on the side wall of the planetary gear. Accordingly, the appended claims are intended to cover all embodiments which do not depart from the spirit and scope of the invention.

What is claimed is:

1. A planetary gear transmission apparatus comprising a sun gear, a first inner gear ring, a second inner gear ring engaged with the first inner gear ring to form an inside space therein, and a planetary gear set comprising a plurality of planetary gears housed in the inside space, the planetary gears having a portion engaged with the sun gear and the first inner gear ring and another portion engaged with the sun gear and the second inner gear ring, the sun gear being driven to rotate the planetary gear set inside the first inner gear ring for transmitting variable speed through the second inner gear ring, wherein, the first and second inner gear rings have substantially the same tooth root circle and the planetary gears are of uniform diameter, rotation contact surfaces between the sun gear, first inner gear ring, second inner gear ring and the planetary gear are curved surfaces for reducing friction loss, the planetary gear set including the plurality of planetary gears each being held by a pin which has two ends held by a pair of spaced gear racks, curved surfaces are formed on side walls of the gear racks facing the first and second inner gear rings, having a curvature of 20–50 times a diameter of the gear racks.

2. The planetary gear transmission apparatus of claim 1 further comprising a curved surface formed on side walls of the gear racks facing the planetary gear having a curvature of 20–50 times a diameter of the planetary gear.

3. The planetary gear transmission apparatus of claim 1 further comprising a curved surface formed on side walls of the planetary gear facing the gear racks having a curvature of 20–50 times a diameter of the planetary gear.

4. The planetary gear transmission apparatus of claim 1 further comprising a curved surface formed on a side wall of the second inner gear ring facing the first inner gear ring having a curvature of 20–50 times a diameter of the second inner gear ring.

5. A planetary gear transmission comprising a sun gear, a first inner gear ring, a second inner gear ring engaged with the first inner ring to form an inside space therein, and a planetary gear set comprising a plurality of planetary gears each being rotatably held by a pin supported at two ends thereof by a pair of spaced gear racks, the sun gear and planetary gear set being mounted in the inside space, the planetary gear set having portion engaged with the sun gear and first inner gear ring for rotating the planetary gear within the first inner gear ring and another portion thereof engaged with the sun gear and second inner gear ring for transmitting rotation through the second inner gear ring, wherein the first and second inner gear rings have substantially the same size of tooth root circle;

the planetary gears are cylindrical and formed with uniform diameters, and are engaged with the first and second inner gear rings for rotation transmission;

rotation contact surfaces between the sun gear, first inner gear ring, second inner gear ring and planetary gears are curved surfaces for reducing friction loss; and, curved surfaces formed on side walls of the gear racks facing the first and second inner gear rings, having curvatures of 20–50 times diameters of the gear gear racks.

6. The planetary gear transmission apparatus of claim 5 further comprising a curved surface formed on side walls of the planetary gear facing the racks having a curvature of 20–50 times a diameter of the planetary gear.

7. The planetary gear transmission apparatus of claim 5 further comprising a curved surface formed on a side wall of the second inner gear ring facing the first inner gear ring having a curvature of 20–50 times a diameter of the second inner gear ring.

* * * * *